March 17, 1931.  L. G. WADE  1,796,816
CONTROL MECHANISM
Filed Aug. 9, 1927
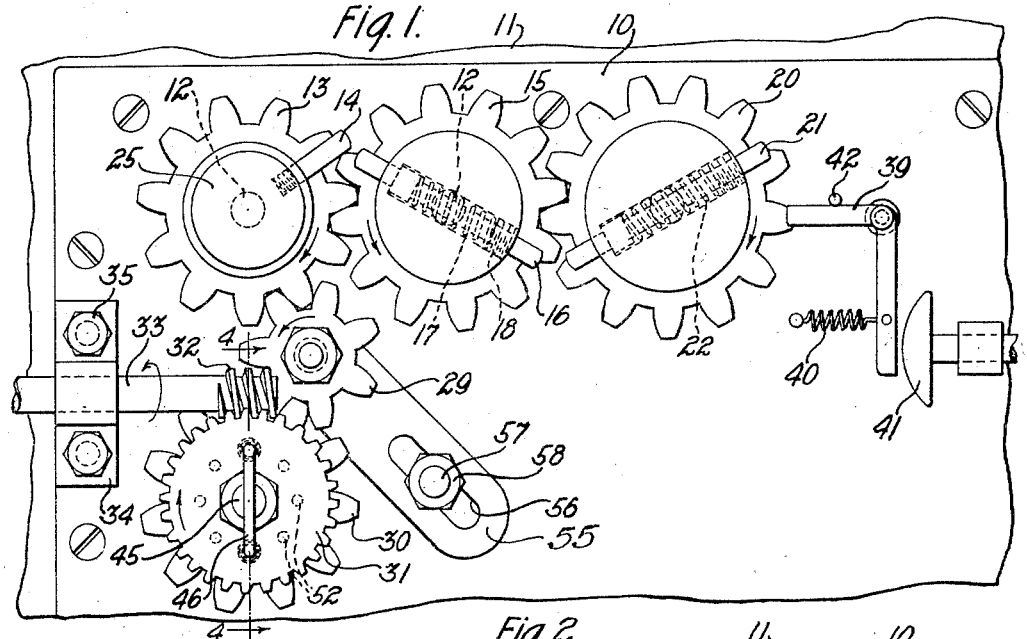
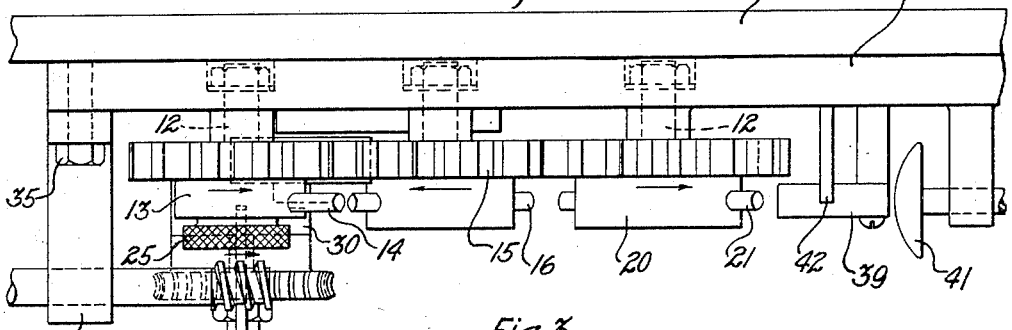
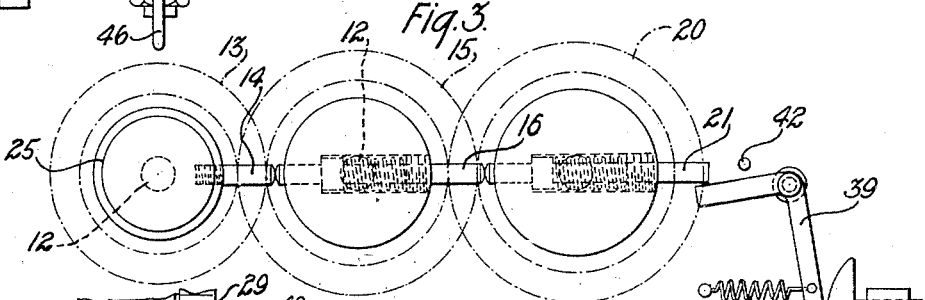
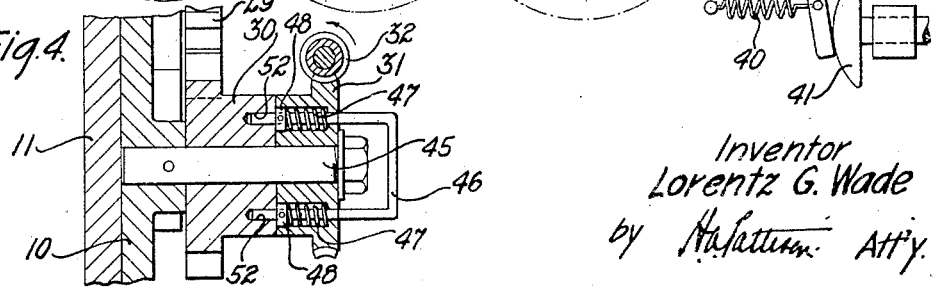
Inventor
Lorentz G. Wade
by [signature] Att'y.

Patented Mar. 17, 1931

1,796,816

UNITED STATES PATENT OFFICE

LORENTZ GEORGE WADE, OF CHICAGO, ILLINOIS, ASSIGNOR TO WESTERN ELECTRIC COMPANY, INCORPORATED, OF NEW YORK, N. Y., A CORPORATION OF NEW YORK

CONTROL MECHANISM

Application filed August 9, 1927. Serial No. 211,688.

This invention relates to control mechanisms, and more particularly to a rotary trip actuating device for controlling machines.

The primary object of the invention is to provide a simple and efficiently operable means for positively and effectively controlling the functioning of a mechanism at predetermined intervals.

In accordance with the general features of the invention, one embodiment thereof includes a plurality of meshing gears varying in size and mounted upon a common member attachable to a conventional machine frame. Mounted within hubs of these gears are cam pins, which are adapted to cooperate with each other to effect the actuation of a tripping device when the pins assume an aligned position upon the completion of a predetermined number of gear revolutions.

The objects of the invention will be more apparent from the following detailed description and the accompanying drawing illustrating one embodiment of the invention, in which Fig. 1 is a fragmentary side view of the device embodying the features of the invention disclosed in association with a machine frame;

Fig. 2 is a plan view of the device disclosed in Fig. 1;

Fig. 3 is a detailed view of the gears showing the relative positions of the cam pins at the interval of actuation, and Fig. 4 is a fragmentary vertical sectional view taken on line 4—4 of Fig. 1.

Referring now to the drawing wherein like numerals are employed to designate similar parts through the various views, it will be observed that one embodiment of the invention includes a mounting plate 10 attachable to a frame 11 which is representative of a frame of a conventional type of machine, such as a punch press, screw machine, high speed strand twisting machine, coil winding machine and the like. Rotatably mounted on this plate 10 by means of a shaft 12 is an 11-tooth gear 13 carrying a cam pin 14 threaded in the hub thereof and meshing with a 12-tooth gear 15 also mounted on the plate 10. The hub of the gear 15 has a movable cam pin 16 normally held in a retracted position by a coil spring 17, which is retained in an aperture in the gear hub by a screw cap 18. The gear 15 in turn meshes with a 13-tooth gear 20, the hub of which carries a movable cam pin 21 similar to the pin 16 and which is held in retracted position by means of a spring 22. The train of gears 13, 15 and 20 are actuated by an idler gear 29 interposed between and meshing with the gear 13 and a driving gear 30 which is associated with a worm gear wheel 31 rotated by a worm 32. The worm 32 is integral with a drive shaft 33 which is suitably supported in a bearing 34 fastened to the mounting plate 10 by machine screws 35. The shaft 33 may be operatively connected in any suitable manner with a driving mechanism (not shown) of the machine with which the plate 10 is associated, and it is to be understood that during each complete cycle or at any predetermined period of operation of the machine, the shaft 33 experiences a predetermined number of revolutions and this number of revolutions is sufficient to cause the gear 13 to make one complete revolution.

In considering gear 13 as a driving gear it will be apparent that upon the completion of each revolution of the gear 13, the driven gear 15 will be rotated thereby through a distance which will fall short of a complete revolution by a distance corresponding with the circular pitch of the gear 15, because there are only eleven teeth in the gear 13 as compared with twelve teeth in the gear 15. Thus, for every twelve revolutions of the gear 13 the gear 15 will be rotated eleven times. If the tooth on the gear 13, which is in line with the center of the pin 14, is traced in its travel from the position occupied by this tooth when it meshes with a companion tooth in gear 15 as shown in Fig. 3 with the pin 14 in a horizontal position, it will be found to return to this same position again and to mesh with the same companion tooth in the gear 15 after the gear 13 has completed twelve revolutions which, of course, necessitates eleven revolutions of the gear 15. Likewise, to have the companion teeth of gears 15 and 20 mesh, which teeth are in line with the center of the cam pins 16 and 21 when in their horizontal position as shown in Fig. 3, it will be necessary to have the gear 15 complete thirteen revolutions. This is necessary because gear 15 has twelve teeth, whereas gear 20 has thirteen teeth and for every revolution of gear 15 the gear 20 will travel through a distance falling short of a complete revolution a distance corresponding to the circular pitch of the gear. Thus to have the same companion teeth which are in line with the cam pins 16 and 21 mesh after said pins are moved from their relative positions shown in Fig. 3, it will require gear 15 to complete thirteen revolutions, while gear 20 makes twelve revolutions. Obviously, upon the completion of the initial twelve revolutions of gear 13, the cam pin 14 will actuate the cam pin 16 of gear 15, but when this occurs the cam pin 21 will not be in alignment to permit actuation because, as previously explained, the gear 15 must make thirteen revolutions to have the cam pin 16 operate the cam pin 21 on the gear 20. Therefore, the cam pins will be in alignment at the instant when the gear 15 has completed sufficient revolutions to equal the least common multiple of the number of revolutions required by the gears 13 and 20, which is eleven and thirteen revolutions, respectively. The least common multiple of thirteen and eleven is 143 and thus the gear 15 must make one hundred and forty-three revolutions in order to effect the simultaneous alignment and actuation of all of the cam pins 14, 16 and 21. The outward movement of the pins 16 and 21 causes the cam pin 21 to engage a pivoted bell crank trip 39 and forces the arms thereof to move counterclockwise against the retracting pull of a spring 40, as shown in Fig. 3. This movement causes the lower arm of the bell crank trip to compress a push button 41 which may be adapted through any conventional means to control electrically or mechanically operative mechanisms (not shown). A stop 42 is adapted to retain the trip 39 in its normal position with the aid of the spring 40.

As shown in Fig. 4, the gears 30 and 31 are rotatably mounted on a shaft 45 and are adapted to be operatively connected to each other by means of a spring pressed U-shaped rod 46. Springs 47 surrounding each leg of the rod 46 are lodged within openings provided in gear 31 and these springs bear against collars 48 fastened to the rod. A plurality of spaced openings 52 in the gear 30 are adapted to receive the ends of the rod 46 so as to permit the association of the gears 30 and 31 at various angular positions. By pulling the rod 46 outwardly against the action of the springs 47, the driving gear 31 may be operatively disconnected from the gear 30 which drives the train of gears 13, 15 and 20.

From the foregoing it will be understood that the described apparatus may readily be associated with various types of machines and that it lends itself particularly adaptable in connection with machines which rapidly produce a large number of parts in successive order. The apparatus serves in such instances as a very effective means for controlling the operation of the associated machine after the machine has completed a predetermined number of operative cycles, or in other words, after a definite number of parts have been produced by the machine. In this connection it will be clear that if a number of parts produced by the machine are rejected as defective during the course of a particular run, it is desirable to continue the operation of the machine beyond the number of cycles determined by the initial setting of the gears 13, 15 and 20. Under such circumstances the machine operator can very readily reset the mechanism to allow for the rejected number of parts by pulling the rod 46 outwardly with one hand to clear the holes in the driven gear 30, thus releasing the train of gears from the driving means. Then, by the operator grasping a knurled hub 25 of the gear 13 with the other hand, the train of gears can be manually rotated in a reverse direction sufficiently to reset the gears to cause the machine to complete the extra number of operations before the trip 39 is actuated to stop the machine. Upon release of the rod 46, the springs 47 return the rod into operative position connecting the gears with the driving means and the machine is ready to complete the run.

The mechanism embodying this invention may be designed with a train of gears consisting of any desired number, two or more, and with any number of teeth in each gear. Manifestly, by a system of change gears the trip can be actuated at any interval desired. To expedite the above changeability, the idler gear 29 is mounted on an arm 55 having an elongated slot 56 through which extends a threaded bolt 57 secured to the mounting plate 10. Thus the axis of the gear 29 is adapted to be shifted to take care of any change in the size of the other gears and a nut 58 is provided for clamping the gear 29 in the proper position.

The invention is especially advantageous where a large number of automatic machines are operated simultaneously and it is desirable to control the individual operation of each machine. In such instances the described control device, which may be associated with each machine will serve to automatically stop each machine after the production of a predetermined number of parts, and thus the number of manual operations of an operator, as well as the number of operators required to supervise the operation of the machines, will be very materially reduced. Although the invention is particularly well adapted for use in connection with the above-mentioned automatic machines, it should be understood that the novel features thereof are capable of many other applications and should be limited only by the scope of the appended claims.

What is claimed is:

1. In a control apparatus, a plurality of continuously interengaging rotary elements of different sizes, and actuating means positioned radially with respect to the axis of rotation of the elements to cooperate with each other upon the completion of a predetermined number of revolutions of the elements.

2. In a control apparatus, a plurality of rotary elements varying in diameter, and actuating means carried by the rotary elements adapted for an aligned engagement with each other upon the completion of a predetermined number of revolutions of the rotary elements.

3. In a control apparatus, a plurality of rotary elements, means for rotating the elements simultaneously, and slidable members carried by the rotary elements adapted to be aligned for actuating purposes upon the completion of a predetermined number of revolutions of the rotary elements.

4. In a control apparatus, a plurality of rotary elements varying in size, a shaft for driving the rotary elements simultaneously, and actuating means associated with the rotary elements designed for engagement with each other upon the completion of a predetermined number of revolutions of the driving shaft.

5. In a control apparatus, a plurality of cooperating gears, means for rotating the gears, actuating means associated with the gears designed for engagement with each other upon the completion of a predetermined number of revolutions of the gears, and means for disconnecting the gears from the driving means to permit the free adjustment thereof.

6. In a control apparatus, a plurality of continuously meshing gears, means for rotating the varying sized gears, and members radially positioned with respect to the gear axes adapted to be aligned for actuating purposes upon the completion of a predetermined number of revolutions of the gears.

7. In a control apparatus, a plurality of normally meshing gears varying in diameter and the number of teeth and continuously engaging each other, means for rotating the gears, and members carried by the gears designed for an aligned engagement with each other for actuating purposes when the gears complete a predetermined number of revolutions.

8. In a control apparatus, a tripping means, a plurality of gears having a varying number of teeth and a member carried by each of the gears and radially positioned with respect to the axes of the gears for actuating the tripping means at a predetermined interval.

9. In a control apparatus, a plurality of gears having a different number of teeth, a driving means for rotating the gears, means for connecting and disconnecting the gears from the driving means, a plurality of cams adapted to engage each other for actuating purposes upon the completion of a predetermined number of revolutions of the gears.

10. In a control apparatus, a mounting plate, a plurality of meshing gears mounted thereon, a driving means for rotating the gears, a tripping means, cam pins carried by the gears and adapted to engage each other for actuating the tripping means upon the completion of a predetermined number of revolutions of the gears.

11. In a control apparatus, a plurality of continuously interengaging elements of varying sizes movable in paths the extent of which vary in accordance with the sizes of the respective elements, and actuating means associated therewith for registering with each other upon the disposition of the interengaging elements in a predetermined manner in their paths.

12. In a control apparatus, a plurality of continuously meshing elements of different diameters capable of normally attaining in sequence a plurality of predetermined respective positions, and actuating means associated therewith for engaging each other when the meshing elements have attained one of their respective positions.

13. In a control apparatus, a plurality of continuously interengaging gears of varying circumferences, and depressible pins diametrically mounted thereon and extending therefrom sufficiently to engage each other upon the gears rotating the requisite number of times.

14. In a control apparatus, a plurality of continuously intermeshing gears of varying circumferences, depressible pins radially extending from the gears for engaging each other when the gears have rotated a predetermined number of times, means for driving said gears, and a composite gear interposed between the driving means and said gears and having a resiliently retained U-shaped member for operatively separating two portions of the composite gear to stop rotation of said gears.

In witness whereof, I hereunto subscribe my name this 28th day of July, A. D. 1927.

LORENTZ GEORGE WADE.